July 1, 1941.   D. SILVERMAN ET AL   2,247,417
ELECTRICAL LOGGING
Filed March 6, 1940   3 Sheets-Sheet 1
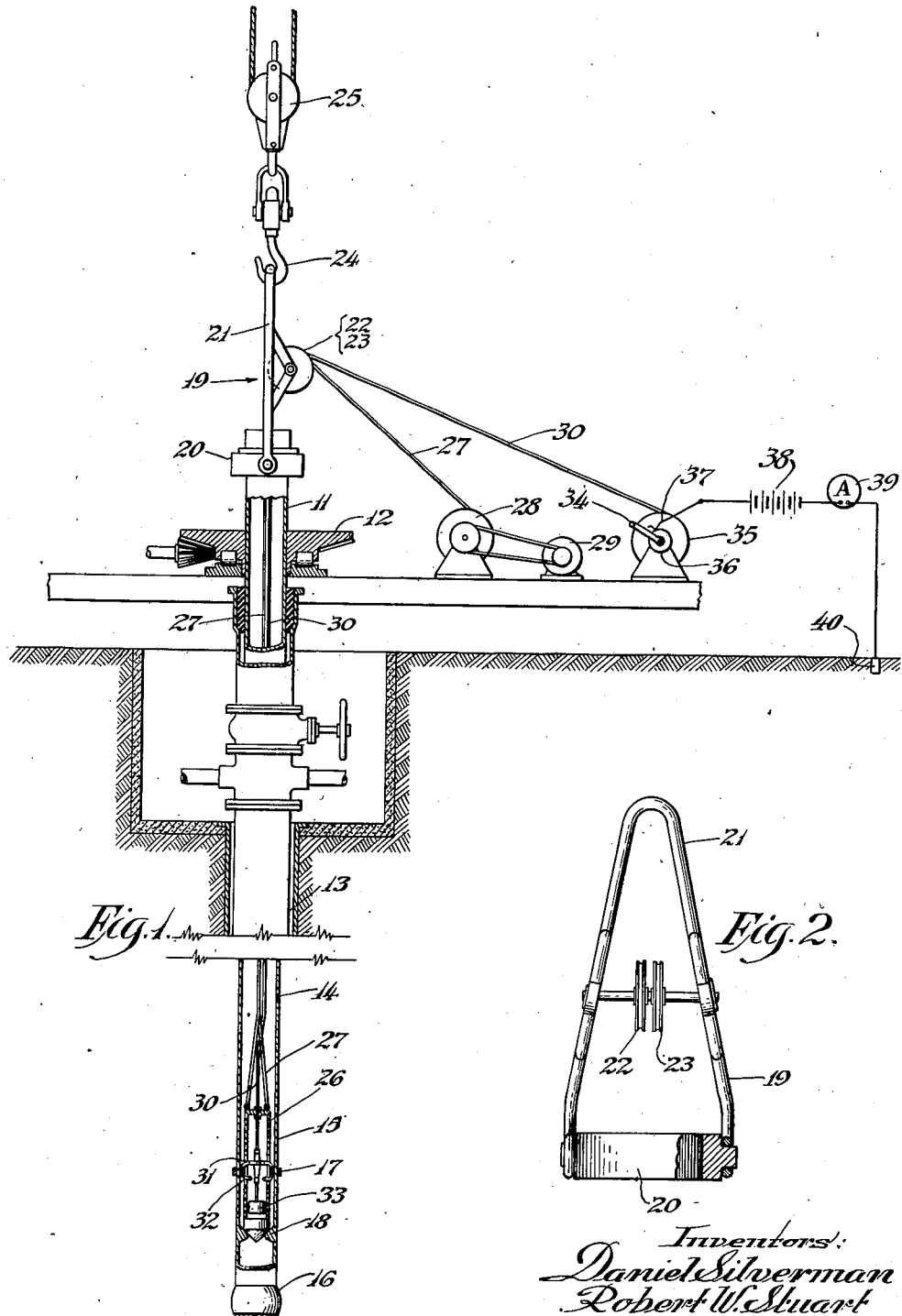
Inventors:
Daniel Silverman
Robert W. Stuart
By Geo. L. Parkhurst
Attorney.

July 1, 1941.   D. SILVERMAN ET AL   2,247,417
ELECTRICAL LOGGING
Filed March 6, 1940   3 Sheets-Sheet 2

Inventors:
Daniel Silverman
Robert W. Stuart
By Geo. L. Parkhurst
Attorney.

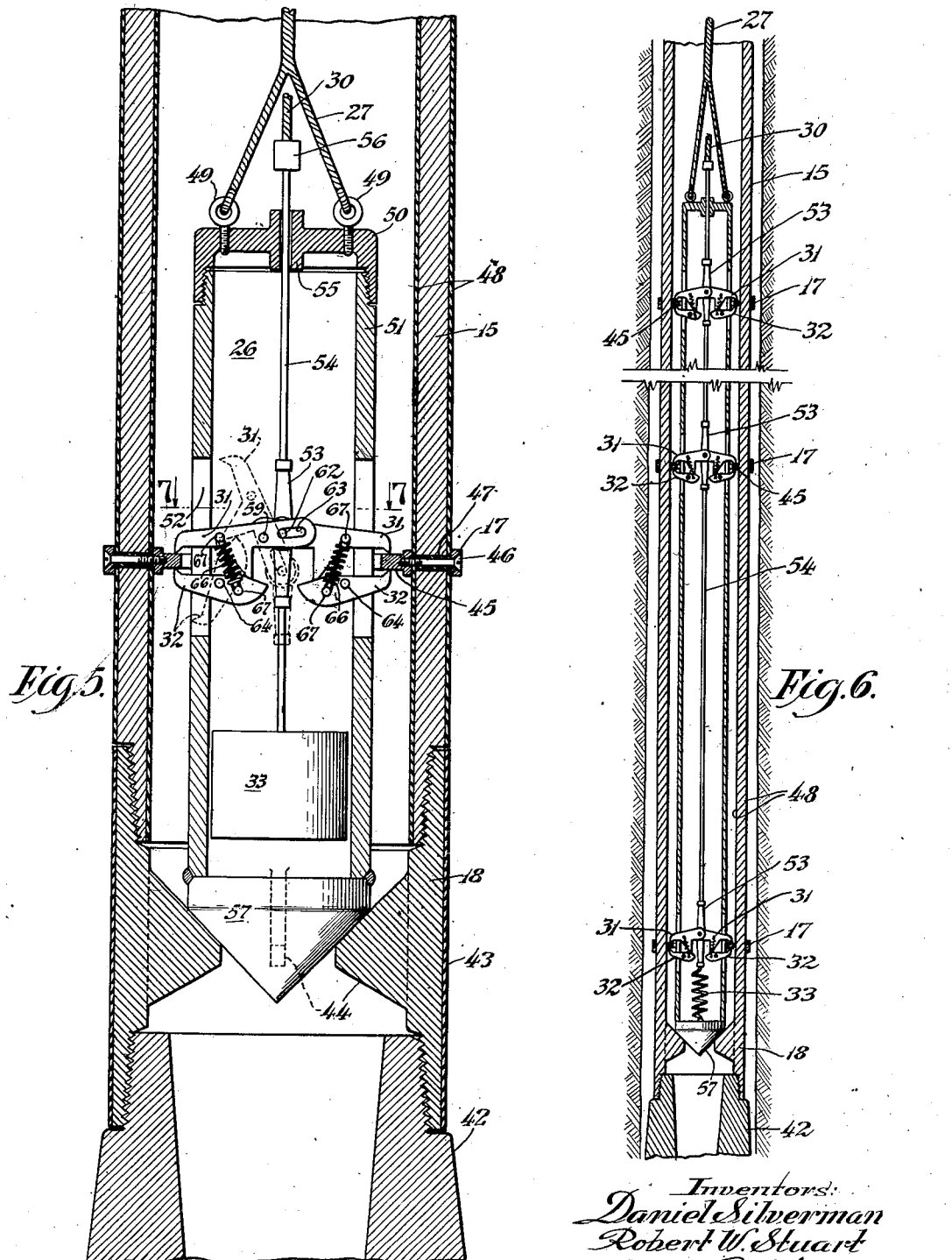

Patented July 1, 1941

2,247,417

UNITED STATES PATENT OFFICE 2,247,417

ELECTRICAL LOGGING

Daniel Silverman and Robert W. Stuart, Tulsa, Okla., assignors to Stanolind Oil and Gas Company, Tulsa, Okla., a corporation of Delaware Application March 6, 1940, Serial No. 322,601

15 Claims. (Cl. 175—182)

This invention relates to methods and apparatus for the electrical logging of wells, particularly oil and gas wells. It relates more especially to methods and apparatus for logging a well in the course of the drilling of that well.

A great variety of electrical logging methods have been used or proposed. In general these methods involve the insertion into the well of an electrode or any array of electrodes and the measurement, by means of instruments located at the surface, of certain electrical characteristics of the formations traversed by the well. In some instances the so-called natural potential is measured while in other and more important instances a source of potential is applied to certain of the electrodes and measurements are made by the use of the same or other electrodes. If a single electrode is used in the well a surface electrode is necessary to complete the circuit and surface electrodes are also frequently used with a plurality of well electrodes.

In general these prior art methods have been restricted to the logging of wells which have been completely drilled but not completely cased. Attempts have been made to develop methods and apparatus for the logging of wells during the actual drilling operation. These methods have involved the use of the drill bit itself or one or more sections of the drill stem as electrodes which can be used while the drilling is actually in progress. This necessitates carrying insulated conductors up through each individual section of drill pipe which in turn necessitates complicated and expensive electrical connections at the drill pipe joints as well as the use of a brush box below the swivel, the employment of a special kelly and other complicated and expensive provisions to make possible the maintenance of the electrical circuits without interference with the drilling operation.

It is an object of our invention to provide a relatively simple and inexpensive method and apparatus whereby electrical logging can be accomplished in the course of a drilling operation. Another object of our invention is to accomplish the foregoing object without the necessity for using special drill pipe joints and other complicated apparatus.

Another object of our invention is to provide methods and apparatus by which one can determine at any desired point in the course of drilling a well the nature of the formations encountered by the drill bit.

A further object of our invention in a preferred form thereof is to provide methods and apparatus for logging a well in the course of a drilling operation without decreasing the structural strength of the drilling equipment.

Other and more detailed objects, advantages and uses of our invention will become apparent as the description thereof proceeds.

In brief we provide in conjunction with the drilling apparatus one or more well electrodes which can be special electrodes of the type hereinafter described or can be merely one or more insulated sections of the drilling apparatus, for instance the drill bit itself, the drill collar or a portion thereof or one or more sections of drill pipe insulated from the remainder of the drilling equipment by sections of insulating material. These electrodes of whatever type they may be are, of course, present throughout the drilling operation but are used as electrodes only when it is so desired. Thus when the driller encounters a formation the nature of which he desires to establish, he lowers into the drill stem (without removing the latter from the hole) a special contactor which makes electrical connections with the electrode or electrodes. This contactor can be of various types and can include one or more pairs of opposed contact arms, single contact arms or radially moving contact arms which are forced outwardly to make contact. Such contactors can be operated mechanically by means of a cable or cables, or hydraulically, e. g. by pump pressure, or by motor operation or other electrical or mechanical means.

The contactor is associated with one or more electrical cables which pass to the surface of the ground within the drill pipe and do not require special electrical connections in the drill pipe joints because of the removability of the contactor and the fact that there is no necessity for maintaining the logging equipment in operative condition during rotation of the drill stem. The cable carrying electrical leads to the electrodes is, of course, associated with suitable surface apparatus and the logging of a section of the bore hole can be accomplished by the simple expedient of raising and lowering the drill stem carrying the electrodes in exactly the same manner as when pulling the drill stem or when running it into the hole.

As an example of the utility of this type of equipment, it is essential when drilling an oil or gas well to know the character of the sediments constituting the various strata through which the bit passes although all types of formations are not, of course, equally important. For instance, the driller can normally tell very readily when a bit is passing from a shale into a sand. At such time it is important to be able to tell what type of sand is involved, i. e. whether it is a gas, oil or water sand. Normally this has been accomplished in the past by means of coring which is a rather unsatisfactory method from the point of view of the cost and time involved. The only other alternative has been to remove the drill stem and log in the conventional manner or to use the complicated type of equipment to which reference was made above involving permanent electrical connections passing through the joints between sections of drill pipe. Either of these alternatives is extremely expensive and consequently is very seldom adopted. In contrast our apparatus is extremely simple and can be used with a minimum of interruption of the drilling operation. The fact that it can be applied immediately after the drill enters the formation and before the drill fluid has had a chance to contaminate the formation to an appreciable extent makes it especially valuable.

Certain preferred methods of applying our invention and certain illustrative apparatus are shown in the accompanying drawings which form a part of this specification and are to be read in conjunction therewith. Like reference numerals are used on like or corresponding parts of the following figures which make up the drawings:

Figure 1 is an elevation partly in section showing one embodiment of equipment for logging a well in accordance with our invention;

Figure 2 is an elevational detail partly in section taken at right angles to the plane of Figure 1 showing another view of the special elevator of Figure 1;

Figure 5 is an elevation partly in section showing the contactor of Figure 1 in more detail;

Figure 6 is an elevation partly in section showing a three-electrode type of contactor.

Figures 3, 4:
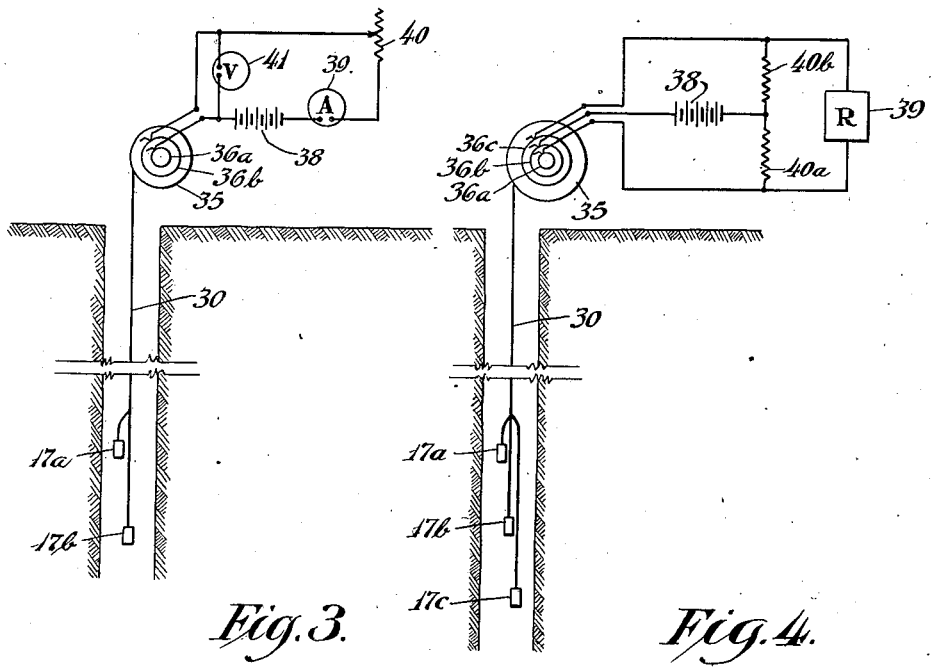
Figures 3 and 4 are simplified diagrammatic showings of alternative electrical circuits which can be used in practicing our invention.

Turning now to Figure 1 in more detail, this figure shows our equipment in condition for a logging operation. However, it may be appropriate to refer first to the condition of the well prior to the insertion of the contactor. We have shown in simplified fashion a conventional rotary drilling operation in which a kelly 11 is rotated by rotary table 12 within a casing 13. The kelly forms the upper part of a drill stem including the customary stands or sections of drill pipe 14. At the bottom of this drill stem is a drill collar 15 carrying drill bit 16, all of which is shown in highly simplified fashion. The drill collar, as will be more fully described hereinafter, carries in this preferred embodiment of our invention an electrode 17 which is insulated from the drill collar 15. A stop 18 is associated with the drill collar. Otherwise the equipment used while drilling is actually in progress is or may be entirely conventional and, of course, includes many items of equipment not shown as well as certain items which are shown but not numbered because they are conventional and irrelevant to the present invention.

When a formation or series of formations is encountered which it is desired to log, the joint either above or below the kelly 11, preferably the former as shown, is broken, the mud swivel (not shown) is removed and special elevator 19 is attached to the kelly or to a section of the drill pipe, whichever is preferred. This elevator (Figure 2) includes clamp 20 which is not shown in detail since it is entirely conventional, and a bail 21 which carries two idler pulleys 22 and 23. The bail 21 is carried by hook 24 which is in turn carried by the conventional travelling block 25.

Contactor 26 is then run in the hole supported by cable 27 which passes over pulley 22 to hoist drum 28 operated by motor 29. Also attached to this contactor 26 is a second cable 30 which during the lowering operation is allowed to run slack. This results, for reasons which will hereinafter become apparent, in raising upper contact arms 31 and lowering lower contact arms 32 within the frame or casing of contactor 26 under the influence of weight 33 so that these arms do not project. The contactor is thus lowered until it hits stop 18 whereupon the cable 30, which passes over pulley 23, is tightened by means of handle 34 on drum 35, or by a suitable motor. The two hoist drums 28 and 35 can be driven by the same motor or can even be carried on the same shaft with a clutch to control the two drums independently when desired so that cable 30 is slack during the insertion and withdrawal of contactor 26 and taut during the actual logging operation.

Cable 30 carries an insulated electrical conduit which is connected to contact arms 31 and 32 and thence to the electrode ring 17. The other end of this conduit passes through the axis of drum 35 to ring 36 which contacts brush 37 and connects with the desired electrical equipment, for instance in the very simple form shown in Figure 1, with battery 38, ammeter 39 and surface electrode 40 as shown. The tightening of cable 30 lifts weight 33 but does not lift contactor 26 as a whole since the latter is much heavier than weight 33. Contact arms 31 and 32 are thus closed in contact with electrode 17. The desired portion of the well can then be logged, as previously described, by raising and lowering the drill stem by means of travelling block 25, keeping cable 30 taut at all times. The readings on ammeter 39 give an indication of the formations encountered. It will be obvious that other more complicated circuits and indicating or recording equipment can be used, for instance the forms shown in Figures 3 and 4.

In Figure 3 there are two electrodes 17a and 17b which are positioned some distance apart on and insulated from the drill collar 15. These electrodes lead to a two-conductor cable 30 and thence to hoist drum 35 which is equipped with two slip rings 36a and 36b. The electrodes are in series with a source of potential 38, ammeter 39 and variable resistance 40. Voltmeter 41 is applied across the electrodes. This ammeter-voltmeter method permits logging by setting up a constant current in the circuit including the two electrodes and measuring the voltage drop across the electrodes, which voltage drop is a function of the resistivity of the formation located adjacent the electrodes.

Turning to Figure 4 three electrodes 17a, 17b and 17c are used on the insulated drill collar 15, the electrodes leading to a three-conductor cable 30 which passes to hoist drum 35, the conductors passing at their other ends to slip rings 36a, 36b and 36c which correspond to electrodes 17a, 17b, and 17c, respectively. The electrodes are arranged in a circuit including a source of potential 38, resistances 40a and 40b and a recorder 39 as shown. This is a particularly advantageous logging circuit and operates on the Wheatstone bridge principle, the four arms being the resistance between electrodes 17a and 17b, the resistance between electrodes 17b and 17c and the resistances 40a and 40b. The source of potential 38 is applied across one diagonal of the bridge and the recording instrument 39, which can be a recording potentiometer, is applied across the other diagonal. If the electrode spacing is uniform and resistances 40a and 40b are of equal value there will be no current flow through the recording instrument 39 so long as the three electrodes are all disposed opposite the same formation but when the upper or lower part of the electrode array enters another formation the bridge is unbalanced and the recorder is affected by an amount and in a direction depending upon the relative electrical properties of the two formations. It is also possible to operate this type of circuit by keeping the bridge constantly in balance by variation of resistance 40a in which case instrument 39 can be merely a sensitive galvanometer.

Turning now to Figure 5, the lower part of this figure shows the shank 42 of drill bit 16 above which is a special sub 43 carrying a stop mechanism which as shown is merely four abutments 44 circumferentially spaced around the sub 43 and designed to provide minimum interference with mud circulation. Sub 43 and abutments 44 constitute stop mechanism 18. Above special sub 43 is drill collar 15 carrying an electrode ring 17 which is connected with an inner ring 45 by means of screws 46. These screws are surrounded by insulation 47 and the interior and exterior of the drill collar are also insulated for some distance above and below the electrode. As shown this is accomplished by insulation 48 which is preferably rubber or synthetic rubberlike material such as Duprene or Thiokol vulcanized to the steel of the drill collar as can be done, for instance by the so-called Vulcalock process. The equipment thus far described in connection with Figure 5 is, of course, present during the drilling operation. When it is desired to log the well, contactor 26 is lowered into place on cable 27. This cable terminates at eye-headed screws 49 carried by top member 50 which is removably attached to a frame or tubing 51 having slots 52 for the action of contact arms 31 and 32, adapted to be operated by carrier 53, the top of which is connected with rod or tube 54 passing through guide 55 in top member 50. Rod 54 is in turn connected to cable 30 by connector 56. Cable 30 is provided with an internal insulated conductor (not shown) leading to or through rod or tube 54 and thence to contact arms 31 and 32. The bottom of the contactor carries a weight 57 shaped to cooperate with abutments 44. As much of contactor 26 as possible other than the contact arms and electrical connections is made of non-conducting material and if metal is used for frame 51, rod 54, etc. it should be covered with insulation. A second weight 33 is suspended from carrier 53.

Figure 7:
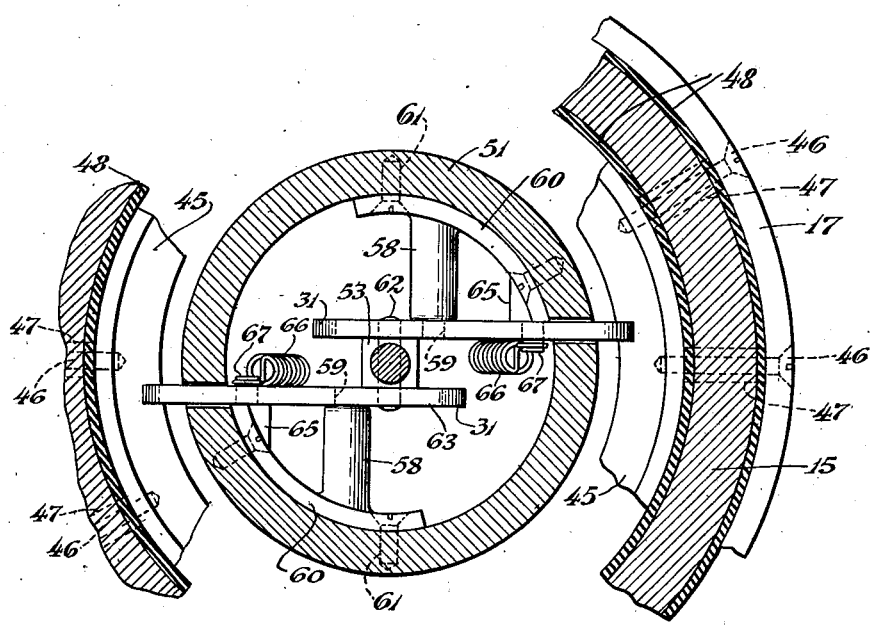
Figure 7 is a horizontal section taken along the line 7—7 of Figure 5 further illustrating the type of contactor shown in Figures 1, 5 and 6.

As best seen in Figure 7, the upper contact arms 31 are pivotally connected to posts 58 by pins 59. Pivot posts 58 are integral with brackets 60 which are in turn fastened to frame or tube 51 by screws 61. These upper contact arms 31 are likewise pivoted to carrier 53 by means of pin 62 passing through slots 63 in the two upper contact arms.

Lower contact arms 32 are pivotally connected by pins 64 (Figure 5) to posts 65 (Figure 7) carried by frame or tube 51, each of them being likewise connected with one of the upper contact arms by means of one of springs 66 passing over projections 67.

From this description of the mechanism its action will be apparent. When the contactor is lowered on cable 27, cable 30 being slack, suspended weight 33 pulls contact arm carrier 53 to the position shown in dotted lines (Figure 5) which in turn raises the upper contact arms to the position shown in dotted lines for the left hand contact arm 31 in Figure 5. Under the action of springs 66 and fixed pivots 64, the lower contact arms 32 are likewise pulled to the position shown in dotted lines. In this condition the contactor is lowered until it hits stop 18 whereupon cable 30 is pulled taut sufficiently to take up the force of weight 33 and to pull the contact arms forcefully into the position shown in full lines in Figure 5 as well as in Figures 1, 6 and 7. This is, of course, only possible because the contactor as a whole is sufficiently heavy to give a resistance against which to pull and it is for this reason that the weighted bottom portion 57 is provided.

When it is desired to withdraw the contactor from the well, cable 30 is released and weight 33 drops, withdrawing contact arms 31 and 32 and the mechanism can then be pulled out of the hole by means of cable 27.

Obviously the contact arms must be carefully positioned with reference to stop 18 and inner contact ring 45. If desired spring pressure pads can be used in connection with inner ring 45 to permit slight variations in the relative positions of the contact arms and inner ring while retaining adequate pressure on each contact to make possible a high pressure over the contact area and insure that there is no film of mud remaining between the inner contact ring and the contacting surface of the contact arms. The contact arms or the ends thereof can be made of some material harder than that of the rings 45. For instance, the contact arms 31 can be made of steel, beryllium-bearing copper or bronze and the inner contact ring can be made of copper. Also the contact points at the ends of contact arms 31 and 32 can be sharpened to the form of a knife edge or series of points which will pierce the surface of the rings and thus make excellent contact even for a moderate pull on cable 30.

While it is not necessary to insulate inner contact ring 45, this can be insulated if desired, for instance by the same method used for the drill collar 15 and the sharpened ends of the contact arms will puncture this insulation and provide adequate electrical contact.

The device of Figure 6 is similar to that of Figure 5 except that three sets of contact arms 31, three inner contact rings 45 and three electrodes 17 are provided with associated equipment. Thus this type of assembly can be used in connection with the circuit of Figure 4 and in fact the principle can readily be used for any desired number of electrodes, the spacing between which can be varied in accordance with the penetration desired and other factors well known in the art of electrical logging. One other difference between Figure 6 and Figure 5 is that element 33 is a spring instead of weight. Either will serve to hold the contact arms in withdrawn position until tension is applied to cable 30.

While we have described our invention in connection with certain examples and suggested embodiments thereof, it is to be understood that numerous other modifications will occur to those skilled in the art in the light of our teachings and that we do not mean to be limited to the specific invention shown but only by the appended claims.

We claim:

1. Apparatus for logging a well in the course of the drilling thereof comprising at least one insulated electrode associated with the drill stem used in drilling said well, a contactor adapted to be inserted into and lowered through said drill stem to a point in the vicinity of said electrode, and means for connecting and disconnecting said contactor from said electrode at will from the top of said well.

2. Apparatus for logging a well in the course of the drilling thereof comprising a drill stem, an electrode associated with the lower end of said drill stem and having a surface exposed exteriorly thereof, means for insulating said electrode from said drill stem, an internal contact member, means electrically connecting said electrode and said contact member, a contactor adapted to be inserted through said drill stem to a point adjacent said contact member, and means for connecting and disconnecting said contactor from said contact member at will from a point above said well.

3. Apparatus for logging a well in the course of the drilling thereof comprising a drill bit, a drill collar, drill pipe, an electrode associated with said drill collar and having a surface exposed exteriorly thereof, means for insulating said electrode from said drill collar, an internal contact member, insulated means electrically connecting said electrode and said contact member, a contactor adapted to be inserted through said drill pipe into said drill collar, and means for connecting and disconnecting said contactor from said contact member at will from a point above said well.

4. Apparatus for logging a well in the course of the drilling thereof comprising a drill stem, at least one insulated electrode associated with said drill stem, stop means associated with said drill stem, a contactor constructed and arranged to be lowered within said drill stem and to be stopped by said stop means opposite said electrode, and means for establishing and disestablishing electrical connection between said contactor and said electrode at will.

5. Apparatus for logging a well comprising a drill bit, a drill stem comprising a drill collar associated with said drill bit and drill pipe associated with said drill collar, a plurality of spaced electrodes associated with and mounted external to the lower part of said drill stem, means for insulating said electrodes from said drill stem and from each other, a plurality of contact members located inside said drill stem, one associated with each of said electrodes, insulated means electrically connecting each of said electrodes with the corresponding contact member, a contactor adapted to be inserted into said drill stem, means for stopping said contactor opposite said contact members, said contactor comprising a plurality of separate clamping means, one for each of said contact members, means for operating said clamping means from the top of said well, and electrical conduits leading from each of said clamping means to the top of said well.

6. In apparatus for logging a well comprising a drill stem and means for raising and lowering said drill stem, the improvement which comprises an electrode mounted outside of said drill stem near the bottom thereof, means for insulating said electrode from said drill stem, an internal contact member mounted on said drill stem and insulated therefrom, insulated means for electrically connecting said electrode with said contact member, a contactor adapted to be inserted within said drill stem and to clamp onto said contact member, means for lowering said contactor within and through said drill stem to a point adjacent said contact member, means operable from above said well for clamping said contactor onto said contact member and for unclamping it therefrom, and an electrical conduit leading from said contactor to a point above the surface of said well.

7. In apparatus for logging a well comprising a drill stem and means for raising and lowering said drill stem, the improvement which comprises an electrode mounted outside of said drill stem near the bottom thereof, means for insulating said electrode from said drill stem, an internal contact member mounted on said drill stem and insulated therefrom, insulated means for electrically connecting said electrode with said contact member, a contactor adapted to be inserted within said drill stem and to clamp onto said contact member, means for lowering said contactor within and through said drill stem to a point adjacent said contact member, means operable from above said well for clamping said contactor onto said contact member and for unclamping it therefrom, a second electrode in electrical communication with the earth, means for applying a potential difference between said two electrodes, and means for observing electrical effects produced by raising and lowering said drill stem, thereby raising and lowering said first-mentioned electrode.

8. In apparatus for logging a well comprising a drill stem and means for raising and lowering said drill stem, the improvement which comprises an electrode ring mounted outside of said drill stem near the bottom thereof, means for insulating said electrode ring from said drill stem, an internal contact ring mounted on said drill stem and insulated therefrom, insulated means for electrically connecting said two rings, a contactor adapted to clamp onto said contact ring, means for lowering said contactor into said drill stem, means associated with said drill stem for stopping said contactor in position to clamp onto said contact ring, means operable from above said well for clamping and unclamping said contactor, and an electrical conduit leading from said contactor to a point above the surface of said well.

9. In apparatus for logging a well comprising a drill stem and means for, raising and lowering said drill stem, the improvement which comprises an electrode mounted outside of said drill stem near the bottom thereof, means for insulating said electrode from said drill stem, an internal contact member mounted on said drill stem and insulated therefrom, insulated means for electrically connecting said electrode with said contact member, a contactor adapted to clamp onto said contact member, said contactor comprising a pair of opposed contact arms pivotally mounted in said contactor to move between a retracted position and a clamping position, means normally urging said contact arms into one of said two positions, and means operable from above the ground for counteracting said urging means.

10. In apparatus for logging a well comprising a drill stem and means for raising and lowering said drill stem, the improvement which comprises an electrode mounted outside of said drill stem near the bottom thereof, means for insulating said electrode from said drill stem, an internal contact member mounted on said drill stem and insulated therefrom, insulated means for electrically connecting said electrode with said contact member, a contactor, said contactor comprising at least one pair of opposed contact arms pivotally mounted in said contactor to move between a retracted position and a position in which said contact arms clamp said contact member, means disposed within said contactor normally urging said contact arms into said retracted position, means operable from the top of said well for moving said contact arms into said clamping position, and an electrical conduit leading from said contactor to a point above the surface of said well.

11. In apparatus for logging a well comprising a drill stem and means for raising and lowering said drill stem, the improvement which comprises an electrode mounted outside of said drill stem near the bottom thereof, means for insulating said electrode from said drill stem, an internal contact member mounted on said drill stem and insulated therefrom, insulated means for electrically connecting said electrode with said contact member, a contactor, said contactor comprising at least one pair of opposed contact arms pivotally mounted in said contactor to move between a retracted position and a position in which said contact arms clamp said contact member, means disposed within said contactor normally urging said contact arms into said retracted position, a cable for raising and lowering said contactor, a second cable associated with said contact arms and serving to move said contact arms from said retracted position to said clamping position, and an electrical conduit associated with one of said cables and passing through said well to said contact arms.

12. In apparatus for logging a well, a contactor adapted to be inserted in said well, said contactor comprising at least one pair of opposed contact arms pivotally mounted in said contactor to move between a retracted position and a clamping position, means normally urging said contact arms into said retracted position and means operable from above said well for opposing said normally urging means and for moving said contact arms into said clamping position.

13. In apparatus for logging a well comprising a drill stem and means for raising and lowering said drill stem, the improvement which comprises a ring electrode mounted on said drill stem externally of said drill stem and near the bottom thereof, means for insulating said electrode from said drill stem, an internal contact ring mounted on said drill stem and insulated therefrom, and insulated means for electrically connecting said electrode with said contact member.

14. A method of logging a well comprising establishing at least one insulated electrode associated with the exterior of a drill stem, applying a potential difference between said electrode and a second electrode, and varying the level of said drill stem without substantial rotation thereof while making an indication of at least one electrical property of the formations traversed by said first-mentioned electrode during said variation in level.

15. In a method of establishing apparatus for well logging, the steps which comprise lowering a contactor within a drill stem, and clamping said contactor to a contact member within said drill stem, said contact member being in insulated electrical contact with an insulated electrode external of said drill stem.

DANIEL SILVERMAN.
ROBERT W. STUART.